(12) United States Patent
Kazakov

(10) Patent No.: US 9,218,686 B2
(45) Date of Patent: Dec. 22, 2015

(54) IMAGE PROCESSING DEVICE

(75) Inventor: Maxim Kazakov, Musashino (JP)

(73) Assignee: DIGITAL MEDIA PROFESSIONALS INC., Tokyo (JP)

( * ) Notice: Subject to any disclaimer, the term of this patent is extended or adjusted under 35 U.S.C. 154(b) by 380 days.

(21) Appl. No.: 13/704,831

(22) PCT Filed: Dec. 2, 2011

(86) PCT No.: PCT/JP2011/077915
§ 371 (c)(1),
(2), (4) Date: Jan. 18, 2013

(87) PCT Pub. No.: WO2012/074092
PCT Pub. Date: Jun. 7, 2012

(65) Prior Publication Data
US 2013/0113790 A1    May 9, 2013

(30) Foreign Application Priority Data
Dec. 3, 2010 (JP) ................................. 2010-270729

(51) Int. Cl.
*G06T 15/00* (2011.01)

(52) U.S. Cl.
CPC .................................... *G06T 15/005* (2013.01)

(58) Field of Classification Search
CPC ......... G06T 19/00; G06T 17/20; G06T 17/00; G06T 15/10; G06T 15/00
USPC ........................................................ 345/419
See application file for complete search history.

(56) References Cited

U.S. PATENT DOCUMENTS

| 7,315,303 | B1 * | 1/2008 | Guskov et al. | 345/423 |
| 7,385,608 | B1 * | 6/2008 | Baldwin | 345/506 |
| 2009/0109219 | A1 * | 4/2009 | DeCoro et al. | 345/423 |
| 2011/0072245 | A1 * | 3/2011 | Duluk et al. | 712/220 |

FOREIGN PATENT DOCUMENTS

| JP | 9-305777 | 11/1997 |
| JP | 2010-123130 | 6/2010 |
| JP | 2010-152702 | 7/2010 |

* cited by examiner

*Primary Examiner* — Ke Xiao
*Assistant Examiner* — Gordon Liu
(74) *Attorney, Agent, or Firm* — Greenblum & Bernstein, P.L.C.

(57) ABSTRACT

The present invention intends to provide an image processing apparatus that can process geometrical primitives rapidly and with restrained memory consumption. A sequence of vertex data of a primitive sequence is stored in an index buffer, and size data of the primitive is stored in the head of the sequence. The result of processing of the primitive sequence in a geometry shader is stored in a cache buffer, and a primitive output, which is the output result stored in the cache buffer, is reused in reprocessing of the primitive processed in the geometry shader.

8 Claims, 9 Drawing Sheets

IMAGE PROCESSING DEVICE

TECHNICAL FIELD

The present invention relates to an image processing apparatus that performs processing of variable size and fixed size geometric primitives.

BACKGROUND ART 3D computer figures are conventionally expressed by using simple geometric primitives such as points, lines and triangles to approximate to complex geometric shapes. Conventional hardware for computer graphics are optimized so as to process such simple primitives rapidly, especially triangle meshes. Therefore, conventional hardware for computer graphics can realize approximation to complex shapes by using various triangles, lines and points.

Generally, in addition to vertex buffer to store vertex data, an index buffer to store reference data to each vertex data per primitive is provided in a GPU (graphics processing unit) to process 3D computer figures. The index buffer accelerates vertex data processing. The vertex data according to primitives stored in the index buffer are sent to shader pipeline composed of stages, such as a vertex shader, geometry shader and pixel shader, as input data and then image processing is performed. For example, such common structure of GPU is illustrated in Patent document 1.

In case of handling primitives that have variable data sizes (i.e. primitives except triangles) in the GPU that has the structure mentioned above, special handling is necessary. Because the sizes of the primitives to be stored in the index buffer are different, so it is necessary to figure out which part of the index buffer corresponds to the vertices constituting each primitive. Therefore, for example, a method that the size of each primitive is stored in the head of index sequence for the primitive and the primitive itself is determined by reading the index sequence head is used.

PRIOR ART PUBLICATION

Patent Document

Patent document 1: Japanese patent publication No. 2010-152702.

SUMMARY OF INVENTION

Problems to be Solved by the Invention

However, a pipeline processing variable size primitives might realize processing algorithm where processing results can be reused, in particular, for the geometry shader stage. Further, in the case when same input is to be processed two or more times by the first geometry shader stage, the output of the first stage in the geometry shader may be reused in the second stage. For example, several outputs of the first geometry shader stage can form a one input primitive to be processed by the second geometry shader stage. In such case, multiple processing of the same input primitive for the first geometry stage is not preferable from the point of processing speed and saving of the memory capacity.

The object of the present invention is to accomplish processing of such primitives within processing pipeline at reduced calculation cost and higher speed.

Means of Solving the Problems

Following solutions can be accepted in the present invention to solve these problems. In first solution, an image processing apparatus comprises an index buffer that stores reference values to vertex data in memory elements as a sequence and a geometry shader that performs processing of a primitive sequence consisting of the vertex data in at least two stages, wherein, in the stage of the geometry shader, an output result of a former stage is reusable. Further, it comprises a primitive determination device determines whether the primitive sequence, which consists of the same vertex data as the vertex data of the primitive sequence stored in the index buffer, is present or not in the index buffer.

In case that the primitive sequence is not found by the primitive determination device, a primitive storing device stores reference values to vertex data constituting the primitive sequence in the index buffer, and the size of the primitive sequence as S value in just front of the head of the data of the primitive sequence.

Meanwhile, in case that the primitive sequence is found by the primitive determination device, a reference data setting device stores reference data, which indicates the location of the primitive sequence from the present position, as a negative integer.

After these processes, an index value determination device performs fetching from the index buffer and determines which of the S value and the reference data is included.

In case that the S value is found by the index value determination device, an geometry shader obtains S number of the vertex data from the just back memory element of the S value stored data next to the S value, and performs processing of the primitive sequence consisting of the vertex data, and an cache device that additionally stores output data from the geometry shader in a cache buffer.

Meanwhile, in case that the reference data is found by the index value determination device, a reuse device fetches the output data of the geometry shader for the primitive sequence, which is stored in the reference location included in the reference data, from the cache buffer and uses the output data.

In second solution, following structure can be accepted. Namely, in case that the primitive sequence is not found by the primitive determination device, a primitive storing device stores vertex data constituting the primitive sequence in the index buffer, and a definition command including primitive ID, which can identify the primitive sequence, in just front of the head of the data of the primitive sequence.

Meanwhile, in case that the primitive sequence is found by the primitive determination device, a reference data setting device stores a reference command to the definition command and removes the data of the primitive sequence defined by the primitive ID included in the definition command stored in the index buffer.

Further, an index value determination device performs fetching from the index buffer and determines which of the definition command and the reference command is included, then an geometry shader obtains the vertex data of the primitive sequence defined by the primitive storing device, and performs processing of the primitive sequence, in case that the definition command is found by the index value determination device, and further, an cache device, in case that the same identifier as the definition command exists, removes the identifier and stores the output data from the geometry shader in the cache buffer by relating to the definition command Meanwhile, in case that the reference command is found by the index value determination device, a reuse device refers to the definition command by the reference command, and fetches the output data of the geometry shader for the primitive sequence, which is related to the definition, from the cache buffer and uses the output data.

Further, in the second solution, the primitive sequence may be variable size primitive, and the primitive storing device may store the definition command and the number of the vertexes of the primitive sequence, which is declared by the definition command, in the same memory element.

Further, the image processing apparatus may send output data from the geometry shader, as input data to the geometry shader, and performs processing again.

The image processing apparatus may further comprise a primitive resetting device integrates or divides a plurality of primitive sequences, and stores the new primitive sequence in the cache buffer.

Further, in storing the output data from the geometry shader in the cache buffer, the output data may be stored in the cache buffer by FIFO.

Advantageous effects of the invention

The present invention realizes an image processing apparatus that has a pipeline to process primitives at reduced processing cost and higher speed.

DESCRIPTION OF EMBODIMENTS FOR CARRYING OUT THE INVENTION

Example 1

Hereafter, embodiments for carrying out the present invention are explained. However the present invention is not restricted within the following embodiments. The present invention involves proper arrangements of the following embodiments by a skilled person.

In the present invention, 3D images are expressed by using primitives. Primitive is a basic unit of geometry, and a primitive normally includes polygon (typically triangle), normal vector, point and so on. In case that primitives are triangles, each triangle is defined by three vertexes and each line is defined by two vertexes. The data of the each vertex relates to the various attributes such as space coordinates, color or texture coordinates.

In the present description, a "shader" is generally used to refer to a hardware subunit of the GPU which executes shading. Further the "shader" is loaded into a memory used in execution of shading (e.g. register storage), and can be used to refer to a set of commands or a token downloaded to the GPU. Generally, a "shader program" can refer to programs and processes that exist in the graphics pipeline to be executed, and they are used to support definition of objects in the 3D graphic environment or surface property of the final image on the display. "Shaders" can perform computing at 1 billion times per second to execute its certain tasks.

Figure 1:
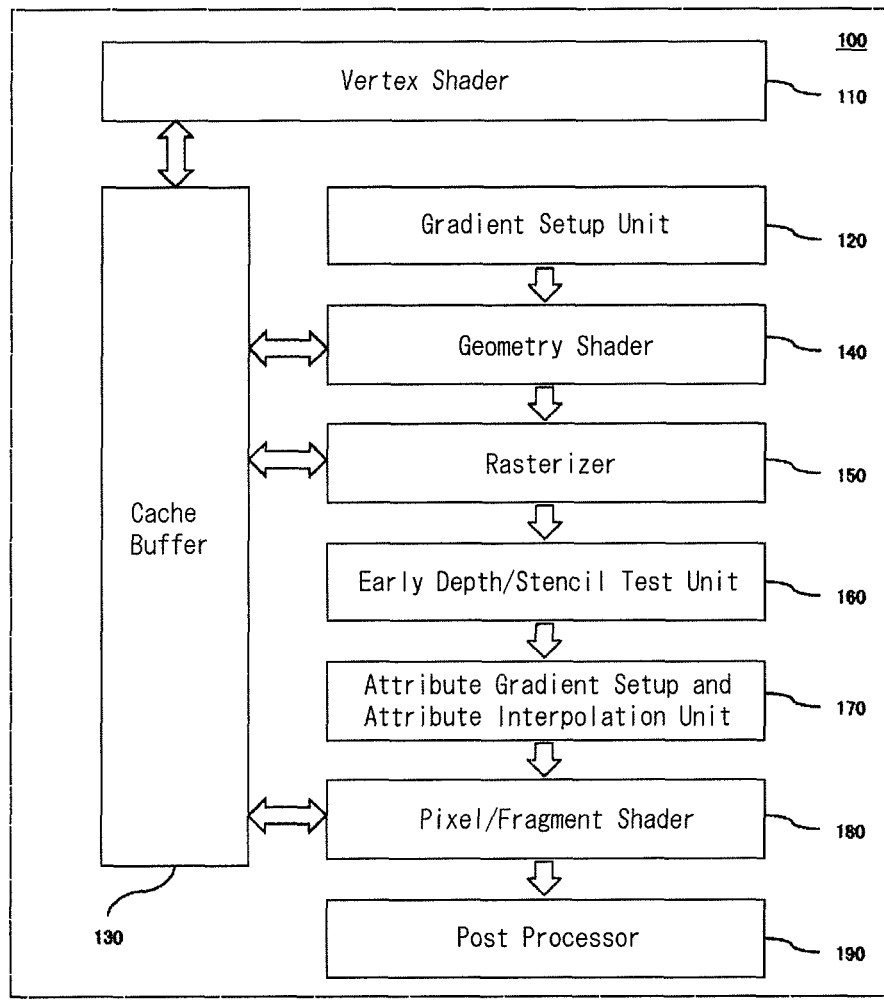
FIG. 1 is a block diagram shows the summarized structure of the image processing apparatus.

FIG. 1 is a block diagram of a 3D graphics pipeline in GPU 100 that is the image processing apparatus. A vertex shader 110 performs vertex processing of shape data including primitives such as triangles and lines. For example, the vertex shader 110 can perform color calculation to a vertex, etc., and blend with the shape. Further, the vertex shader 110 may determine the value of coordinate and attribute of each vertex (for example, x, y, z and w), provide the vertex coordinates with a triangle setup and depth/gradient setup unit 120 and provide the attribute of the vertex with a cache buffer 130. The cache buffer 130 stores attributes and other data of vertexes and primitives.

A geometry shader 140 performs processing per primitive, such as increase or decrease of the vertex data and generating a new primitive from the vertex data by obtaining a primitive, which has information of the adjacent or all primitives and consists of the vertex data processed in the vertex shader 110. Further, the geometry shader 140 may perform processing in at least two stages. For example, there is a case that it is necessary to handle a plurality of primitives as one primitive and process them again in the geometry shader. In such case, the output data of the geometry shader 140 is stored in the cache buffer 130, and then the output data stored in the cache buffer 130 is input again to the next stage in the geometry shader 140. The present embodiment is especially effective in such case. This will be described hereinafter in more detail. A rasterizer 150 decomposes each primitive into pixels and generates screen coordinates of each pixel.

An early depth/stencil test unit 160 may perform a stencil test for the pixel to determine whether the pixel should be rendered or discarded. The early depth/stencil test unit 160 compares the stencil value that is stored in the stencil buffer for pixels with a pixel's value, and then determine whether the pixel is passed or discarded on the basis of the comparison result. The early depth/stencil test unit 160 may perform the depth test (it is also called z test) to determine whether the pixel should be rendered or discarded. For example, the early depth/stencil test unit 160 compares z value of a pixel (current z value) with the z value (stored z value), which is corresponding to the current z value in a z buffer. Then if the current z value is closer than the stored z value, the pixel is passed, and z buffer and stencil buffer are updated. Meanwhile, if the current z value is deeper than the stored z value, the early depth/stencil test unit 160 discards the pixel.

Attribute gradient setup and attribute interpolation unit 170 interpolate the attribute value of the vertexes of the primitive to obtain attributes of the pixels within the primitive. At first, the attribute gradient setup and attribute interpolation unit 170 may calculate parameters for the attribute interpolation on the basis of the attribute values of the vertexes. These parameters may be attribute gradients or coefficient of a linear equation for the attribute interpolation. Then the attribute gradient setup and attribute interpolation unit 170 can calculate the attribute value of each pixel of each primitive on the basis of the screen coordinates and interpolation parameters of the pixel.

A pixel/fragment shader 180 may perform various graphic processes for the pixels and fragments. A fragment is a pixel and its relating data. For example, the pixel/fragment shader 180, if it is possible, may perform texture mapping for the pixels to apply textures. Texturization is realized by setting the color of the pixel to the color of the texture image on the location indicated by the texture coordinates of the pixel. A post processor 190 may perform other graphic processing for each fragment such as alpha-test, fog blending, alpha-blending, logic operations and dithering calculations. The post processor 190 outputs pixels to a color buffer to display on the display device (both are not shown in figure.).

In the GPU 100 in the present embodiment, the result of processing by the geometry shader 140 is also stored in the cache buffer 130. For example, this is an effective method for the case that the geometry shader 140 has several stages and result of processing in the previous stage should be reused. FIFO (First In, First Out) is adopted for this cache buffer 130 and, for example, the number of cacheable sequences is set at four. This number of sequences can be changed as appropriate.

Figure 2:
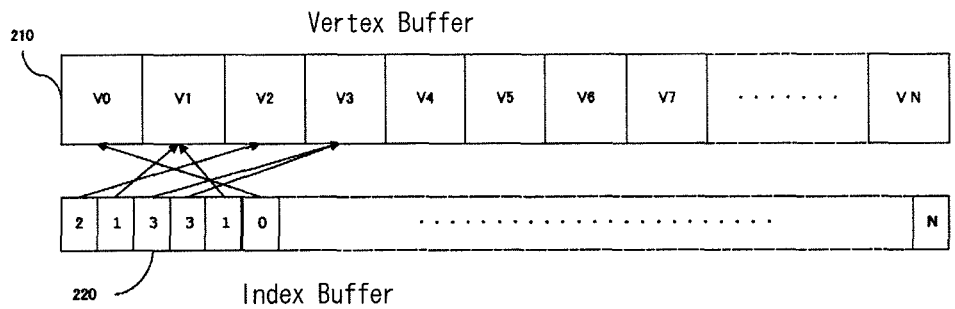
FIG. 2 is a block diagram shows the summarized structure of the index buffer and vertex buffer.

FIG. 2 shows the structure of buffers to describe primitives (e.g. vertex data of a triangle or line, or sequence data). A vertex buffer 210 stores vertex coordinates and attribute interpolation coefficient of the primitive. Each vertex buffer location can store (x, y, z, w) coordinates and attribute interpolation coefficient ($\alpha$, $\beta$) of one vertex. Each vertex buffer location has valid/invalid flag that represents whether the buffer location stores a valid vertex.

An index buffer 220 stores indexes of vertexes of the primitive. These indexes indicate the location of vertexes stored in the vertex buffer 210. Each memory element of the index buffer 220 can store a pointer (or an index) for one vertex buffer location.

A location is reserved in front of the head of the primitive in the index buffer 220 to store the size of the primitive, i.e. the number of the vertex data constituting the primitive. The index buffer 220 forms a sequential storage area. The indices following the location of the size data S up to primitive size are recognized as vertex data constituting the primitive. Further, in the present embodiment, in case that the primitive already present in previous primitive sequence, a reference data N, which is represented by a negative value, is stored in the index buffer 220, and is not interpreted as pointer to vertex array content. The reference data N means that same primitive is located minus N primitives before the present primitive. Further the size data S is necessary for handling variable size primitives, but in case of fixed size primitives, the size data can be omitted.

Figure 3:
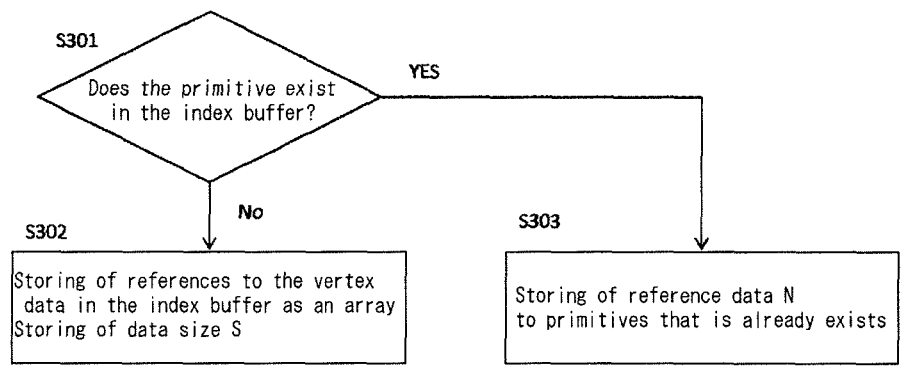
FIG. 3 is a flow diagram shows procedures of storing vertex data in the index buffer in the first example.

Next is explained an algorithm to prepare index buffer 220 with FIG. 3. Generally, the process of preparing index buffer is performed before the processing in the vertex shader 110. However, in this embodiment, the process may be performed in a shader program as appropriate because of handling variable size primitives. At first, step 301 is performed to determine whether a primitive is already present in the index buffer. A concrete example of determination method is determining whether the same index sequence is present in the index buffer 220 as one for the primitive in question.

Next, in case that the primitive is not found (in case of No) by the determination of step 301, the algorithm moves to the step 302. In step 302, references to the vertex data in the vertex buffer 210 are stored as an array of indices in index buffer, and the size of the primitive, i.e. the number of vertices constituting the primitive, is stored as size data S in its head area.

In case that the primitive is found (in case of Yes) by the determination of step 301, then the algorithm moves to the step 303. In step 303, a reference data N to the primitive that already exists is stored in the offset value (a negative value indicating the location of the primitive, that already exists, from the present position) format, instead of storing index of the vertex data indices in the index buffer as an array. The following is an example of the setting of the offset value. At first, the determination for a primitive is started from the head of the index buffer 220. If the primitive is found, a counter is set at 1. After that, if a size data S or reference data N is found, the counter is increased by 1. Then, at the end of the search, minus sign is added to the value of the counter, and the reference data N is set at the value.

Figure 4:
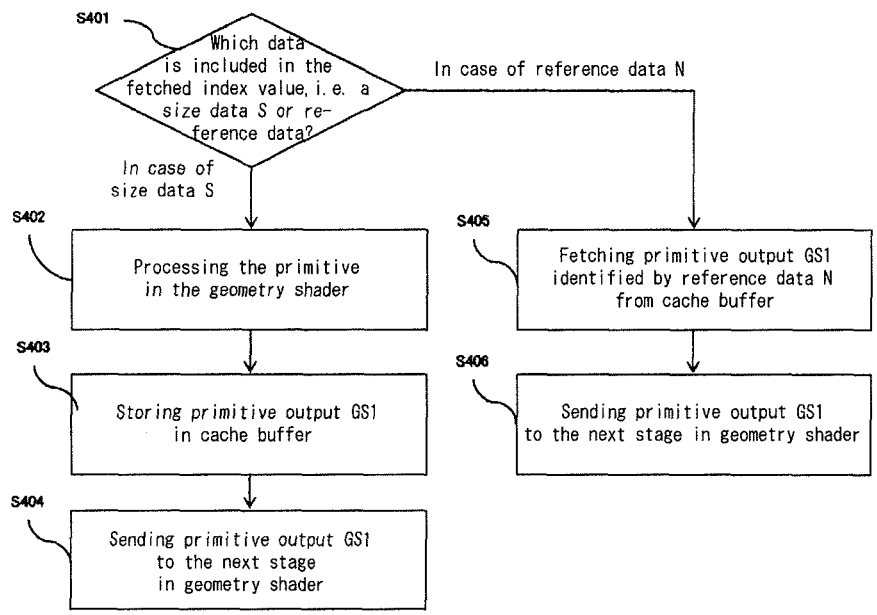
FIG. 4 is a flow diagram shows a process flow through the geometry shader in the first example.

There is a case that it is necessary to process in the several stages of the geometry shader 140, as mentioned above. However, the present embodiment can realize accelerated processing for such case. The method is explained specifically by using an algorithm shown in FIG. 4. FIG. 4 shows a process flow about storing the result of process from the geometry shader 140 into the cache buffer 130 per primitive unit. At first, in step 401, the index values stored in the memory elements of the index buffer 220 are fetched in order, and determined which data is included in the fetched index value, i.e. a size data S or reference data N, is performed.

In case that the size data S is found in the index values through the determination of step 401, the calculation of the primitive represented by the array of indices is performed in the geometry shader 140, by obtaining the array of the positional data of the S number vertex data from the index buffer 220, in the step 402. The first result of processing for the primitive in the geometry shader 140 is represented by primitive output GS1.

Next, the primitive output GS1 from the geometry shader 140 is stored additionally in the cache buffer 130 in step 403. In step 404, this value is sent as input to the next stage in the geometry shader 140.

Meanwhile, in case that reference data is found in the index values through the determination in step 401, it can be say that a primitive output GS1 exists in the cache buffer 130 because the primitive is already processed in the geometry shader 140. Therefore the primitive output GS1 is obtained and reused in step 405. Further, in step 406, the primitive output GS1 is sent as input to the next stage in the geometry shader 140.

Each primitive cached in the cache buffer 130 is reused in the next stage in the geometry shader 140 by the repeating processing of the primitive in each index buffer 220. Therefore, reduced processing cost and accelerated processing can be realized because it is not necessary to perform calculation again for the primitive. Further, accelerated processing can be also realized by reuse of the primitive output GS1 in the stages after the first stage in the geometry shader 140

An example of actual image processing and operation of the present invention is explained by using FIG. 5

Figure 5A:
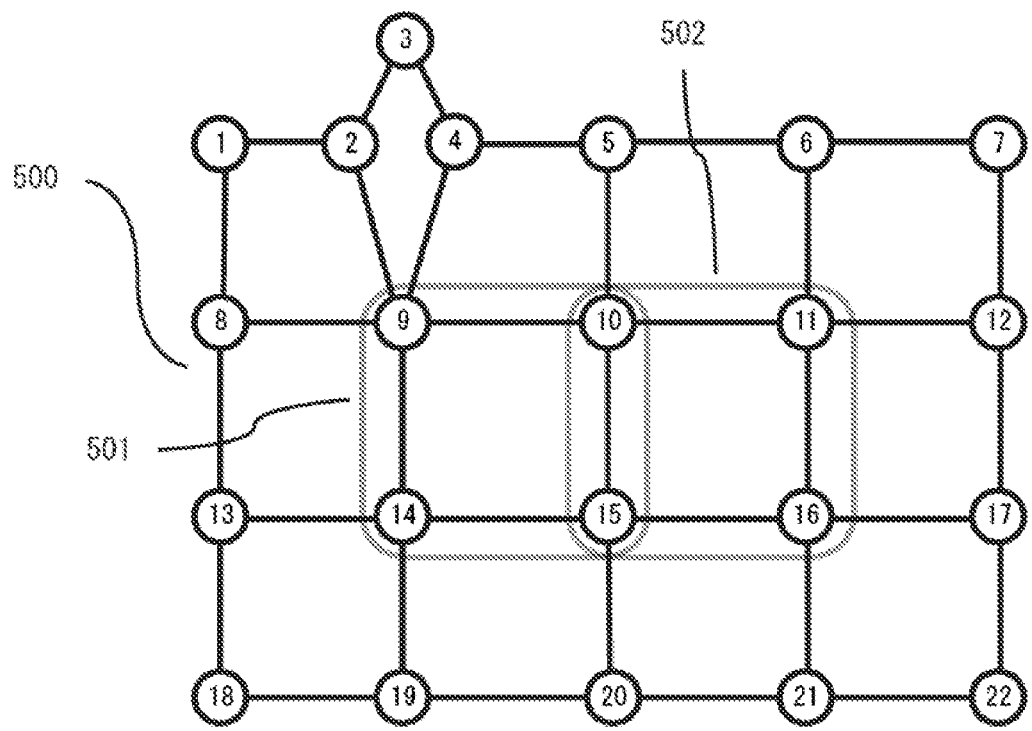
FIG. 5(a) shows a polygon mesh.

The polygon mesh 500, which is shown in FIG. 5(a), is a mesh consisting of 22 vertexes. In this embodiment, a square 501 that consists of vertexes 9-14-15-10 and a square 502 that consists of vertexes 10-11-16-15 are processed by Catmull-Clark subdivision method, regarding the polygon mesh 500. In this processing method, primitives including each vertex and its adjacent vertexes are input to the geometry shader 140. Namely, in processing square 501, the four primitives that contain 9, 14, 15 and 10 are processed, and in processing square 502, the four primitives that contain 10, 11, 16 and 15 are processed.

Figure 5B:
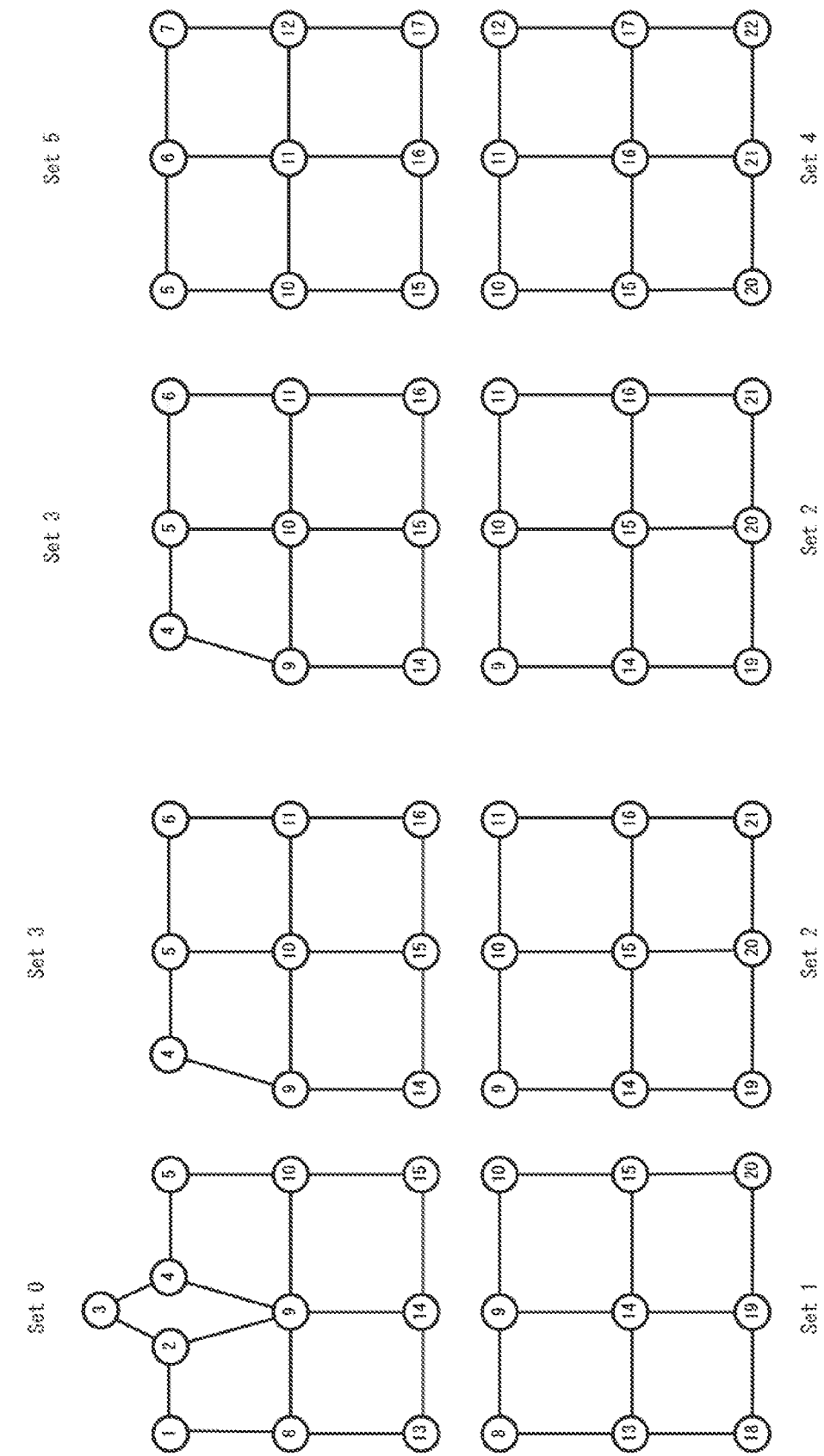
FIG. 5(b) shows the primitives divided from the mesh and adjacent primitives.
Figure 5C:
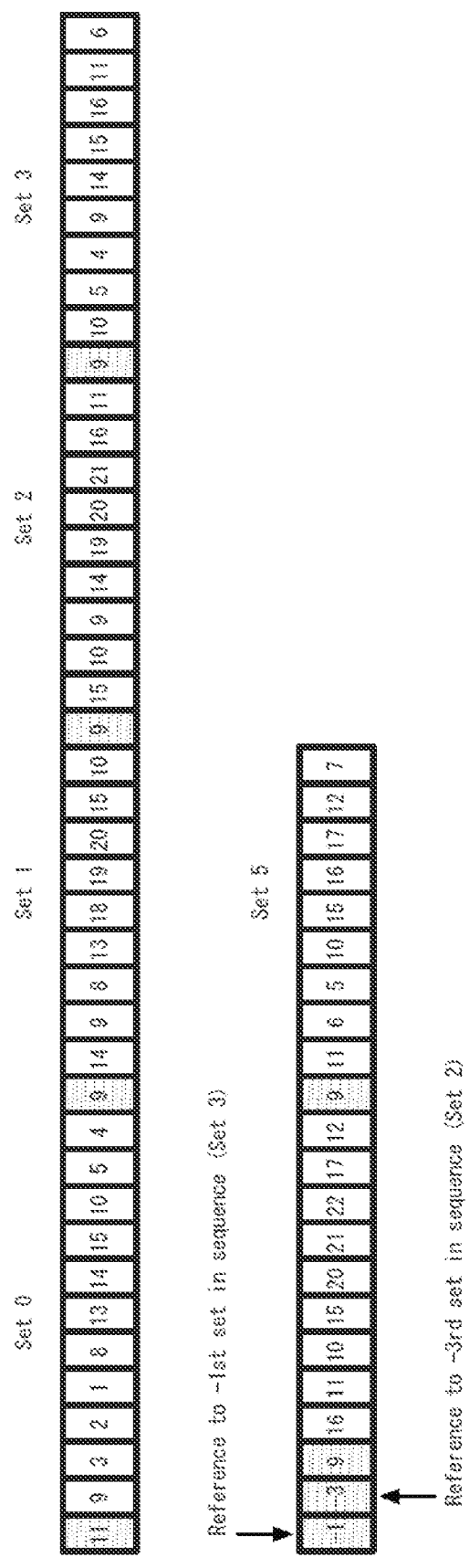
FIG. 5(c) is a schematic diagram of these primitives in the index buffer

In FIG. 5(b), the polygon mesh 500 is divided into primitives, which are processing units for processing in the geometry shader 140. These primitives are represented by Set 0 to Set 4. FIG. 5(c) shows the index buffer 220 storing Set 0 to Set 4 primitives.

As shown in FIG. 5(b) and (c), Set 0 is formed by 11 vertexes, i.e. 9-3-2-1-8-13-14-15-10-5-4. So "11" is stored in the index buffer 220, as the size data S of the primitive. In the index buffer 220, Set 1 is stored in an area adjacent to Set 0. Set 1 is a primitive formed by vertices 14-9-8-13-18-19-20-15-10 and "9" is stored in its head, as the size data S of the primitive. In case of Set 2, "9" is also stored in its head as S value and 15-10-9-14-19-20-21-16-11 are stored in order. In case of Set 3, "9" is also stored in its head as S value and 10-5-4-9-14-15-16-11-6 are stored in order. Next, as Set 3 and Set 2 are reused, the reference data N, which is represented by an offset value as mentioned above, is stored without storing the vertex indexes data again, because these primitives already exist in the index buffer 220. So, "−1" is stored as reference data N because Set 3 is located in just back area. Then "−3" is also stored as reference data N to the Set 2. Further, the primitive formed by 16-11-10-15-20-21-22-17-12 is stored in the index buffer 220 as Set 4 and "9" is stored in its head, as the size data S. The primitive formed by 11-6-5-10-15-16-17-12-7 is also stored in the index buffer 220 as Set 5 and "9" is stored in its head, as the size data S.

Figure 6:
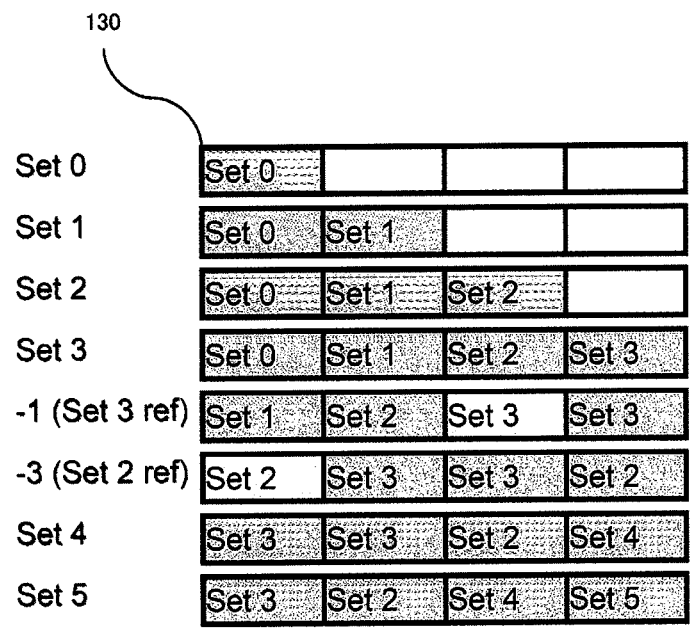
FIG. 6 is a schematic diagram of the cache buffer

Next, in the polygon mesh 500, the operation to store the result of processing of geometry shader 140 in the cache buffer 130 is explained with reference to FIG. 6. FIG. 6 is a block diagram that shows the cache structure of the cache buffer 130 for the primitive GS1, which is the output from the geometry shader 140.

As shown in FIG. 6, the cache buffer 130 has four memory elements. The output data is stored in the cache buffer 130 per processing in the geometry shader 140. This processing corresponds to Step 403 in the FIG. 4.

At first, in the processing of Set 0 to Set 3, each primitive GS1 is input in order from the head of the cache buffer 130. Each output value is represented by Set 0 to Set 3. After storing Set 3, all the memory elements of the cache buffer 130 are occupied. Therefore, in storing the next output data of Set 3 (−1 of reference data N), Set 0 stored at first is deleted, and the data of Set 1 to Set 3 are shifted forward by one element, and then the new output data of Set 3 is freshly stored in the fourth, empty memory element. The same procedure can be applied when Set 2 is referred and both Set 4 and Set 5 are stored.

Example 2

Figure 7:
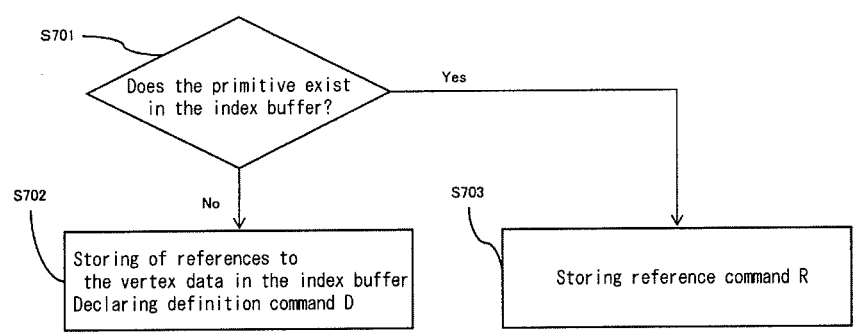
FIG. 7 is a flow diagram shows procedures of storing vertex data in the index buffer in the second example.

This section explains the another example of the present invention. In the example 2, the way of storing the reference data in the index buffer 220 is different from the way of the example 1. FIG. 7 shows an algorithm of the example 2 to store a primitive in the index buffer 220. At first, step 701 is performed to determine whether a primitive is already stored in the index buffer 220. A concrete example of determination method is performing obtaining the vertex data of the primitive and determining whether primitive formed by the same vertex sequence exists in the index buffer 220.

When the primitive is not found (in case of No) by the determination of step 701, the index sequence for the vertices forming the primitive, is stored in the end of the index buffer 220 as an array, in the step 702. Further, the definition of the primitive is stored in just front of the head data of the primitive as a definition command D. Furthermore, the definition command D identifies primitive output GS1, which is output from the geometry shader 140 and also relates to the address of the cache buffer 130 of the primitive output GS1 which is stored in the cache buffer 130. The primitive ID to identify a primitive is specified in the definition command D.

Further, the definition command D may be stored with the size data S of the related primitive in the same memory element. If the primitive with the same identification data was previously used, the definition command D redefines ID to primitive mapping and overwrites it with one for the primitive, which is defined by the new definition command D, and overwrites previous processing results for the primitive with same ID stored in the cache buffer 130. In this embodiment, the number of primitives that can be declared with definition command D is corresponding to the number of elements in the cache buffer 130. In this example, four primitives can be declared and definition commands from D0 to D3 are selectable.

Meanwhile, in case that the primitive is found (in case of Yes) by the determination of step 701, the reference command R to the definition command D is stored, and the data of the primitive stored in the index buffer 220 is deleted. The reason of deleting the data of the primitive is to release the storage area, because the processing of the primitives in the index buffer 220 is already done and the result is stored in the cache buffer 130.

Figure 8:
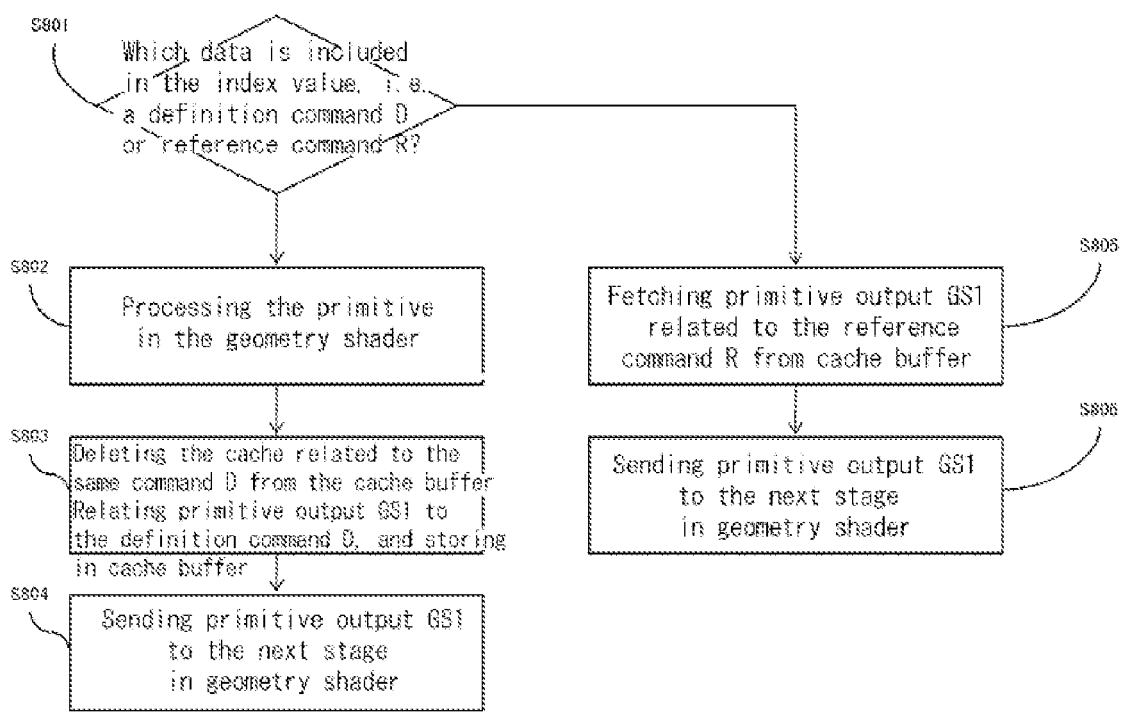
FIG. 8 is a flow diagram shows a process flow through the geometry shader in the second example.

Next, the process flow in the geometry shader 140 in the present example is explained with reference to FIG. 8.

At first, in step 801, the index values stored in the index buffer 220 are fetched in order, and then it is determined whether a definition command D or reference command R is present in index value. In case that the definition command D is found by the determination of step 801, the processing of the primitive is performed in the geometry shader 140, by obtaining the size of the stored primitive, in the step 802. Further, in case that the size of the primitive is fixed, this processing can be performed without obtaining the size.

Next, in step 803, if the output data of the primitive that is already defined by the same identifier as the primitive ID included in the definition command D is present in the cache 130, the cache contents is deleted from the cache buffer 130, and then the output data from the geometry shader 140 is associated to the same definition command D and stored in the cache buffer 130. Namely, in case that the same identification data as the definition command D exists, overwriting is performed, and in case that the same data does not exist, a new definition command D is set.

Further, the primitive output GS1 from the geometry shader 140 is sent as input to the next stage in the geometry shader 140, in step 804.

Meanwhile, in case that a reference command R is found by the determination in step 801, the output of processing from the geometry shader 140, which is the primitive defined by the primitive ID included in the definition command D referred by the same reference command R, is fetched from the cache buffer 130 and reused, in step 805. Further, the fetched primitive output GS1 is sent as input to the next stage in the geometry shader 140, in step 806.

Figure 9:
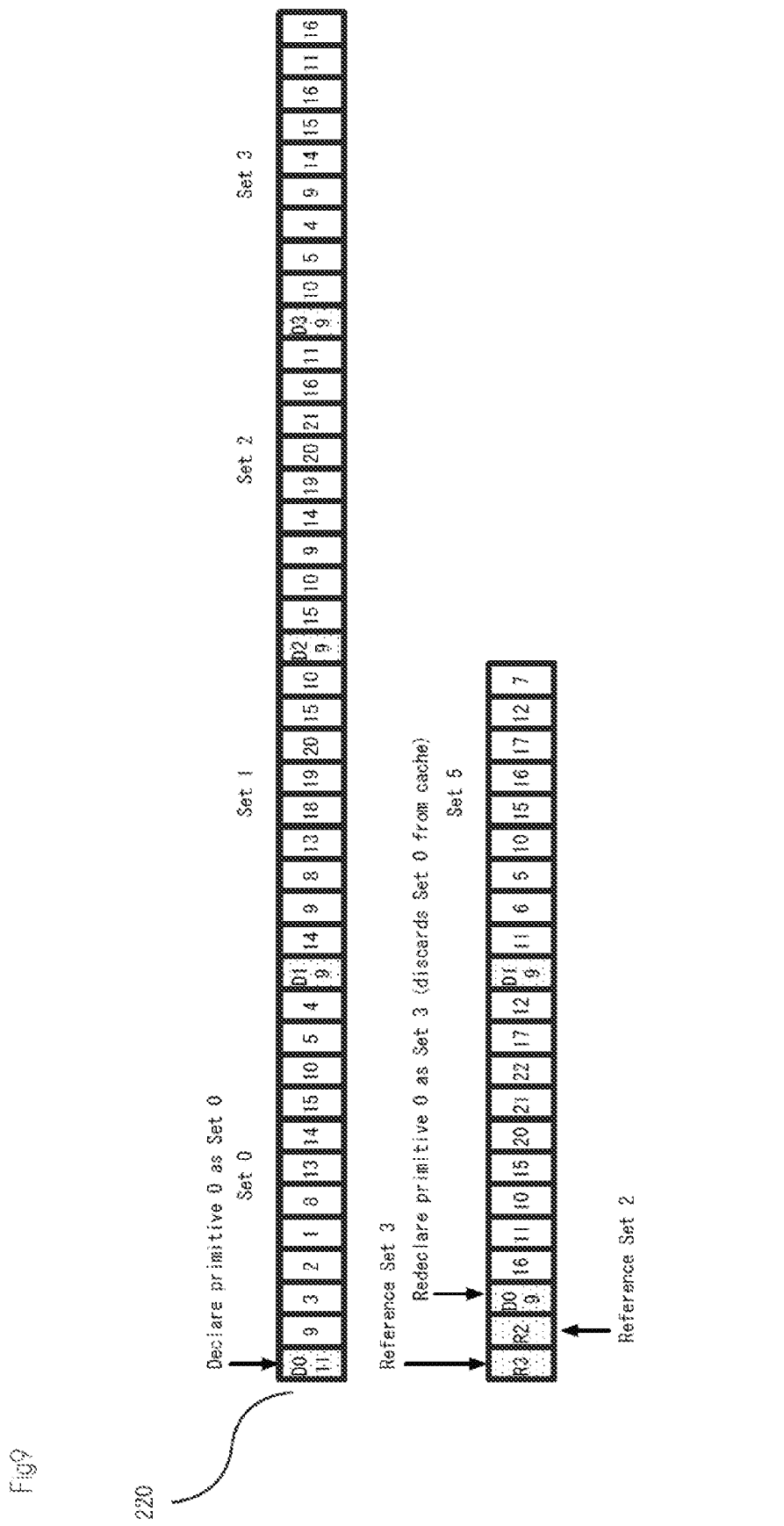
FIG. 9 is a schematic diagram of primitives of the second example in the index buffer.

Next, the storing way for the polygon mesh 500, which is illustrated in the example 1, in this example is explained by using FIG. 9.

As shown in FIG. 9, Set 0 is formed by 11 vertexes, i.e. 9-3-2-1-8-13-14-15-10-5-4, so "11", as the size data S of the primitive, and definition command D0 are stored in the index buffer 220. In the index buffer 220, Set 1 is stored in the contiguous area to Set 0. Set 1 is a primitive consists of 14-9-8-13-18-19-20-15-10, so "9", as the size data S, and primitive definition command D1 are stored in its head. In case of Set 2, "9", as the size data S, and definition command D2 are also stored in its head and 15-10-9-14-19-20-21-16-11 are stored in order. In case of Set 3, "9", as the size data S, and definition command D3 are also stored in its head and 10-5-

4-9-14-15-16-11-6 are stored in order. Next, although Set 3 and Set 2 are reused, the reference command R is stored without storing the reference value to the vertex data again, because these primitives already exist in the index buffer 220. Therefore reference command R3 and R2 are stored in order. Further, a primitive formed by 16-11-10-15-20-21-22-17-12 is stored in the index buffer 220 as Set 4. So "9", as the size data S, and definition command D0 are stored in its head. At this point, the first D0 command is overwritten with a new definition because all the commands, i.e. D0 to D3, are already defined. Further, a primitive formed by 11-6-5-10-15-16-17-12-7 is also stored in the index buffer 220 as Set 5. So "9", as the size data S, and definition command D1 are stored in its head.

Figure 10:
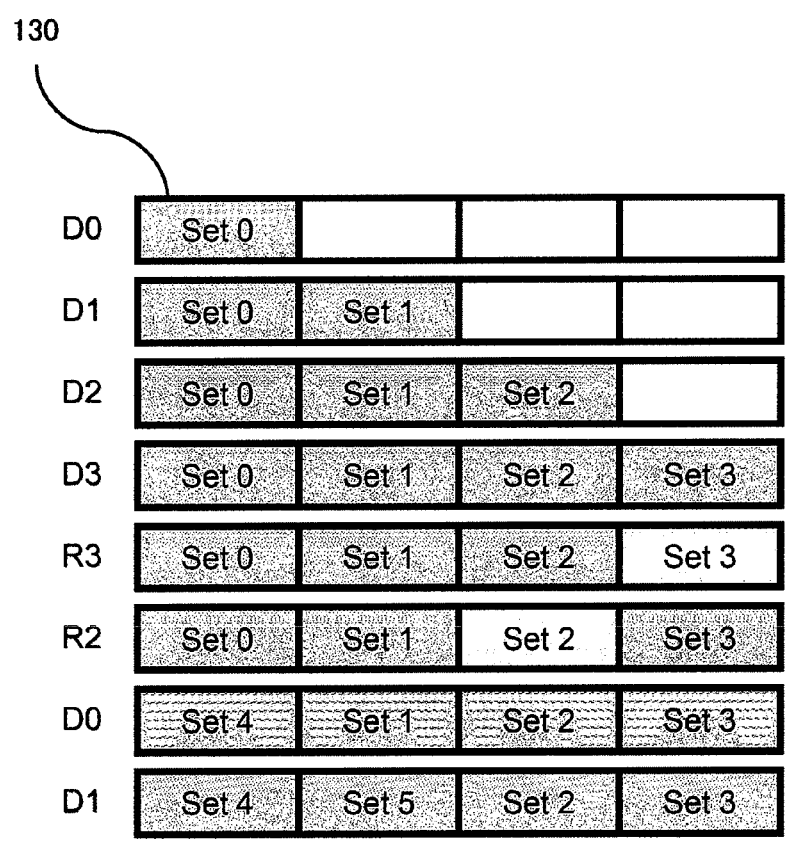
FIG. 10 is a schematic diagram of primitives of the second example in the cache buffer.

Next, about the polygon mesh 500, the operation to store the result of processing of geometry shader 140 in the cache buffer 130 is explained with reference to FIG. 10. FIG. 10 is a block diagram that shows the structure of the cache buffer 130.

At first, in the processing of Set 0 to Set 3, primitive GS1, which is each output result, is input in order from the head of the cache buffer 130. After storing Set 3, all the memory areas of the cache buffer 130 are occupied. Therefore, in declaring of R3 and R2, the cache buffer 130 is not modified, and the primitive output GS1 of Set 3 and Set 2, which are already stored, is reused. Then, in storing Set 4, definition for the D0, which is stored at first, is performed, because D0 to D3 are already used. Therefore the primitive output GS1 of Set 4 is stored in the location where Set 0 was stored. In storing Set 5, definition for the D1 is also performed, and the primitive output GS1 of Set 5 is stored in the location where Set 1 was stored.

As mentioned above, the image processing apparatus of the second embodiment can also store the result of processing of the primitive, which is stored in the cache buffer 130, in the geometry shader 140 as primitive output GS1, and reuse the result of processing as the definition command D and reference command R. Therefore the image processing apparatus of the second embodiment realizes efficient reuse of the result of processing of primitives and accelerates their processing.

DESCRIPTION OF THE REFERENCE NUMERALS

100 GPU
110 Vertex shader
120 Gradient setup unit
130 Cache buffer
140 Geometry shader
150 Rasterizer
160 Early depth/stencil test unit
170 Attribute gradient setup and attribute interpolation unit
180 Pixel/fragment shader
190 Post processor
210 Vertex buffer
220 Index buffer
500 Polygon mesh
501 Square
502 Square

The invention claimed is:

1. An image processing apparatus that performs processing of a primitive sequence, comprising:
an index buffer that includes memory elements and stores reference values to vertex data as a primitive sequence, an S value and an offset value, in the memory elements;
a geometry shader that performs processing of the primitive sequence including the vertex data in at least two stages, in a latter stage, an output result of a former stage being usable,
a primitive determiner that determines whether or not a primitive sequence which is to be stored in the index buffer is present in the index buffer;
a primitive storage that stores the reference values to vertex data constituting the primitive sequence in the index buffer, and a size of the primitive sequence as the S value immediately in front of a head of the primitive sequence in the index buffer, when the primitive sequence is not found in the index buffer by the primitive determiner;
a reference data setter that stores the offset value into the index buffer and does not store the vertex data constituting the primitive sequence, when the primitive sequence is found in the index buffer by the primitive determiner, the offset value indicating a location of the primitive sequence in the index buffer from a present position in the index buffer, as a negative integer, the offset value being determined by searching for the primitive sequence in the index buffer from a start of the index buffer, counting a number of the S value and the offset value stored in the index buffer after the primitive sequence is found, and adding a minus sign to a total counted number of the S value and the offset value,
an index value that performs fetching from the index buffer and determines which of the S value and the offset value is included in the index buffer;
the geometry shader obtaining S number of the vertex data from a memory element immediately subsequent to a memory element storing the S value, and performing processing of the primitive sequence including the vertex data, when the S value is found by the index value determiner;
a cache that stores output data from the geometry shader in a cache buffer; and
a reuser that fetches the output data of the geometry shader obtained by processing the primitive sequence, which is stored in the index buffer in the location indicated by the offset value, from the cache buffer, and uses the fetched output data, when the offset value is found by the index value determiner.

2. The image processing apparatus that performs processing of a primitive sequence in accordance with claim 1, wherein the image processing apparatus sends the output data from the geometry shader, as input data to the geometry shader, and performs processing by using a result of processing of the primitive sequence included in the output data.

3. The image processing apparatus that performs processing of a primitive sequence in accordance with claim 2, the image processing apparatus further comprising a primitive resetter that integrates or divides a plurality of primitive sequences, and stores a new primitive sequence in the cache buffer.

4. The image processing apparatus that performs processing of a primitive sequence in accordance with claim 1, wherein, in storing the output data from the geometry shader in the cache buffer, the output data is stored in the cache buffer by FIFO.

5. An image processing apparatus that performs processing of a primitive sequence, comprising:
an index buffer that includes an memory elements and stores reference values to vertex data as a primitive sequence, a definition command and a reference command in the memory elements, a geometry shader that performs processing of the primitive sequence including the vertex data in at least two stages, in a latter stage, an output result of a former stage being usable, a primitive determiner that determines whether or not a primitive sequence which is to be stored in the index buffer is present in the index buffer;

a primitive storage that stores the vertex data constituting the primitive sequence in the index buffer, and the definition command including a primitive ID, which identifies the primitive sequence, immediately in front of a head of the primitive sequence in the index buffer, when the primitive sequence is not found in the index buffer by the primitive determiner;

a reference data setter that stores the reference command, which refers to the definition command, into the index buffer, and does not store the vertex data constituting the primitive sequence in the index buffer, and removes, from the index buffer, the primitive sequence defined by the primitive ID included in the definition command stored in the index buffer, when the primitive sequence is found in the index buffer by the primitive determiner;

an index value determiner that performs fetching from the index buffer and determines which of the definition command and the reference command is included in the index buffer;

the geometry shader obtaining the vertex data of the primitive sequence defined by the primitive storage, and performing processing of the primitive sequence, when the definition command is found in the index buffer by the index value determiner;

a cache that, when an identifier same as the definition command is present, removes the identifier and stores the output data from the geometry shader in the cache buffer in association with the definition command; and, a reuser that refers to the definition command by the reference command, fetches the output data of the geometry shader for the primitive sequence, which is related to the definition command, from the cache buffer, and uses the fetched output data, when the reference command is found by the index value determiner.

6. The image processing apparatus that performs processing of a primitive sequence in accordance with claim 5, wherein the primitive sequence comprises variable size primitives, the primitive storage stores the definition command and a number of vertexes of the primitive sequence, which is declared by the definition command, in a same memory element.

7. An image processing apparatus that performs processing of a primitive sequence, wherein the primitive sequence is defined by an index buffer, wherein the index buffer stores indices referencing vertex data, a primitive size value S and a primitive-size-value-S reference data in memory elements of the index buffer, wherein the image processing apparatus comprises:

a geometry shader that performs processing of the primitive sequence, and comprises at least two stages, wherein output results of a first stage form an input of a second stage;

an index value determiner that performs fetching from the index buffer and determines whether primitive-size-value-S reference data, which refers to a previous primitive in the primitive sequence, is fetched, wherein the primitive size value S prefixes a vertex index list forming the primitive sequence in the index buffer, and wherein the primitive-size-value-S reference data referring to the previous primitive is represented by a negative number stored in the index buffer, the negative number indicating an offset to a same primitive in a sequence of previous primitives in the index buffer, the negative number being determined by searching for the same primitive in the index buffer from a start of the index buffer, counting a number of the primitive size value S and the primitive-size-value-S reference data stored in the index buffer after the primitive is found, and adding a minus sign to a total counted number of the primitive size value S and the primitive-size-value-S reference data;

the geometry shader obtains S number of the vertex data corresponding to S indices following the primitive size value S in the index buffer, and performs processing of the primitive including the vertex data, when the primitive size value S is found in the index buffer by the index value determiner;

a cache that stores output data from the geometry shader first stage in a cache buffer; and a reuser that fetches the output data of the geometry shader first stage for the primitive, which is stored in a reference location included in the primitive-size-value-S reference data, from the cache buffer, and to use the output data, when the primitive-size-value-S reference data is found in the index buffer by the index value determiner.

8. An image processing apparatus that performs processing of a primitive sequence, wherein the primitive sequence is defined by an index buffer, wherein the index buffer stores indices referencing vertex data, a primitive definition command and a primitive reference command in memory elements of the index buffer, wherein the image processing apparatus comprises:

a geometry shader that performs processing of a primitive sequence, and comprises at least two stages, wherein output results of a first stage form an input of a second stage;

an index value determiner that performs fetching from the index buffer and determines whether the primitive definition command or the primitive reference command is included;

the primitive definition command including a primitive ID, which identifies a primitive, the primitive definition command prefixing a list of vertex indices forming the primitive in the index buffer, and removing definition of the primitive defined by a previous primitive definition command for a same primitive ID, and the primitive reference command referencing the previous definition command for the same primitive ID;

the geometry shader obtaining the vertex data of the primitive and performing processing of the primitive, when the definition command is found in the index buffer by the index value determiner;

a cache that, when a same identifier as the primitive definition command exists, removes the identifier and stores the output data from the geometry shader first stage in the cache buffer in association with the definition command; and a reuser that refers to the definition command by the reference command, fetches the output data of the geometry shader first stage for the primitive, which is related to the primitive definition command, from the cache buffer, and uses the output data, when the primitive reference command is found in the index buffer by the index value determiner.

* * * * *